(12) United States Patent
VanBlon et al.

(10) Patent No.: US 9,875,075 B1
(45) Date of Patent: Jan. 23, 2018

(54) PRESENTATION OF CONTENT ON A VIDEO DISPLAY AND A HEADSET DISPLAY

(71) Applicant: Lenovo (Singapore) Pte. Ltd., New Tech Park (SG)

(72) Inventors: Russell Speight VanBlon, Raleigh, NC (US); Arnold S. Weksler, Raleigh, NC (US); Nathan J. Peterson, Oxford, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/218,694

(22) Filed: Jul. 25, 2016

(51) Int. Cl.
*G06F 3/00* (2006.01)
*G06F 3/14* (2006.01)
*G02B 27/01* (2006.01)
*G06F 3/0485* (2013.01)
*G06F 3/0484* (2013.01)

(52) U.S. Cl.
CPC ....... *G06F 3/1454* (2013.01); *G02B 27/0172* (2013.01); *G06F 3/0485* (2013.01); *G06F 3/04845* (2013.01); *G02B 2027/014* (2013.01)

(58) Field of Classification Search
CPC .......... G02B 2027/014; G02B 27/0172; G06F 3/04845; G06F 3/1454; G06F 3/0485
See application file for complete search history.

(56) References Cited

U.S. PATENT DOCUMENTS

2015/0264529 A1* 9/2015 Cho .................... H04M 1/7253
455/456.6
2016/0350057 A1* 12/2016 Kwon ................... H04W 8/005

* cited by examiner

*Primary Examiner* — Muhammad N Edun
(74) *Attorney, Agent, or Firm* — John M. Rogitz (57) ABSTRACT

In one aspect, a headset includes a housing, a processor coupled to the housing, and a first, at least partially transparent display coupled to the housing and accessible to the processor. The headset also includes storage coupled to the housing and accessible to the processor. The storage bears instructions executable by the processor to identify at least a portion of content presentable on a second display that is not currently presented on the second display and present at least the portion of the content on the first display based on the identification.

20 Claims, 7 Drawing Sheets

PRESENTATION OF CONTENT ON A VIDEO DISPLAY AND A HEADSET DISPLAY

FIELD

The present application relates generally to the presentation of content on a video display and the display of a headset.

BACKGROUND

As recognized herein, the ability to present content on a video display of a device such as a smart phone is sometimes limited by the size of the video display. As a result, a user may strain his or her eyes to view the content, and/or an adequate amount of the content may not be presentable at a given time. This can be frustrating to the user, and there are currently no adequate solutions to the foregoing computer-related problem.

SUMMARY

Accordingly, in one aspect a headset includes a housing, a processor coupled to the housing, and a first, at least partially transparent display coupled to the housing and accessible to the processor. The headset also includes storage coupled to the housing and accessible to the processor. The storage bears instructions executable by the processor to identify at least a portion of content presentable on a second display that is not currently presented on the second display and present at least the portion of the content on the first display based on the identification.

In another aspect, a method includes determining that at least a portion of content presentable on a first display of a device is not currently presented on the first display, and presenting at least the portion of the content on a second display of a headset based on the determining.

In still another aspect, an apparatus includes a first processor, a network adapter, and storage. The storage bears instructions executable by a second processor for identifying at least a portion of content presentable on a video display that is also presentable on an at least partially transparent display of a headset and presenting, based on the identifying, at least the portion of the content on the at least partially transparent display of the headset so that the portion appears to a wearer of the headset to be adjacent to the video display. The first processor transfers the instructions to the second processor over a network via the network adapter.

The details of present principles, both as to their structure and operation, can best be understood in reference to the accompanying drawings, in which like reference numerals refer to like parts, and in which:

DETAILED DESCRIPTION

Disclosed herein are systems and methods for presenting content either jointly using a real-world display and a "virtual display" that is itself presented using a headset with an at least partially transparent display, or alternatively moving presentation of the content to the at least partially transparent display alone.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
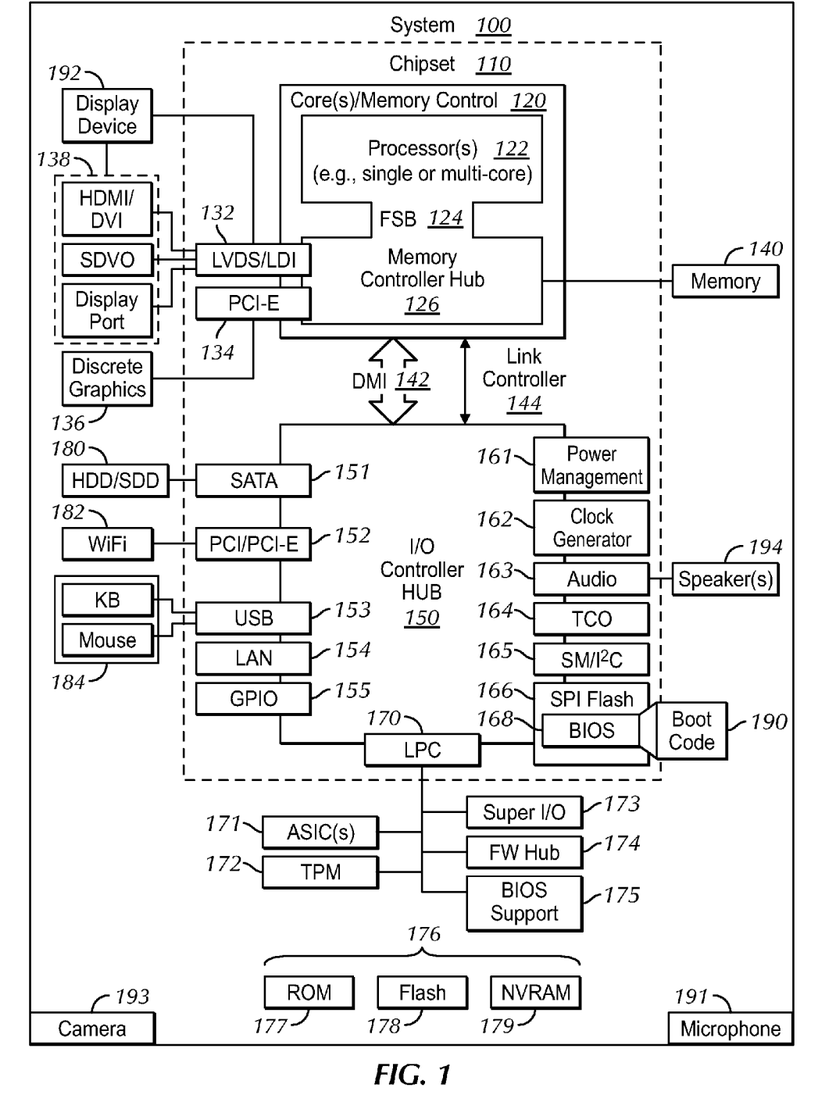
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, an at least partially transparent and/or "heads up" display, a holographic display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Even further, the system 100 may include an audio receiver/microphone 191 that provides input from the microphone to the processor 122 based on audio that is detected, such as via a user providing audible input/commands to the microphone 191. The system 100 may also include one or more cameras 193 that gather images and provide input related thereto to the processor 122. The cameras 193 may be thermal imaging cameras, digital cameras such as webcams, three-dimensional (3D) cameras, and/or cameras otherwise controllable by the processor 122, and integrated into and/or disposed on the system 100, to gather pictures/images and/or video such as images of a user's eyes for eye tracking purposes, images of gestures being performed by the user such as pointing at a particular item within the user's surroundings, images of the surroundings themselves, etc.

Additionally, though not shown for clarity, in some embodiments the system 100 may include a gyroscope that senses and/or measures the orientation of the system 100 and provides input related thereto to the processor 122, and an accelerometer that senses acceleration and/or movement of the system 100 and provides input related thereto to the processor 122. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
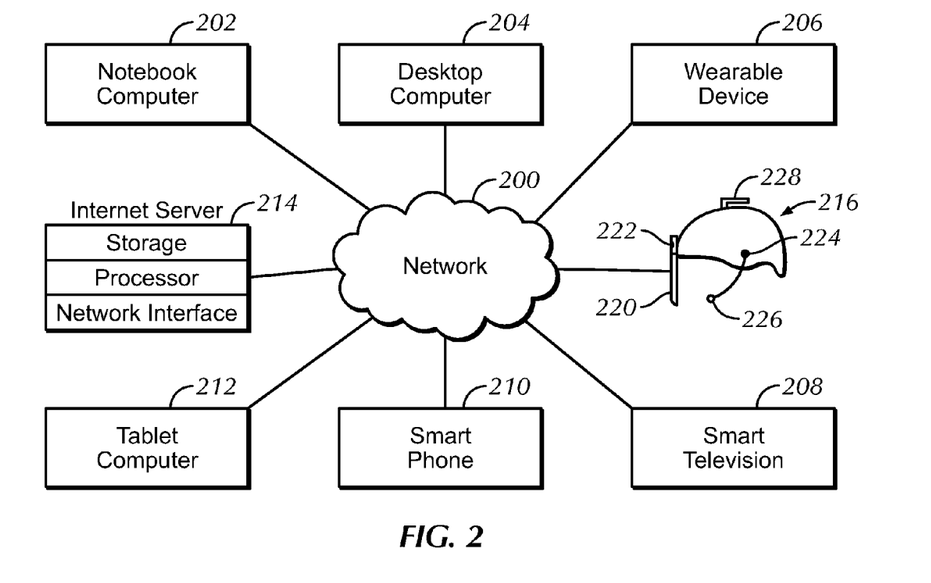
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be a virtual reality (VR) headset in some examples, an augmented reality headset in other examples, and/or Internet-enabled computerized glasses in still other examples. The headset 216 may include a housing to which an at least partially transparent display 220 is coupled for presenting content in accordance with present principles. Thus, the at least partially transparent display 220 may permit a wearer of the headset to view real-world objects through it while wearing the headset 216, while also being configured to present content on the display 220 itself such as images, web pages, documents, etc.

The headset 216 may also include plural cameras 222 that may be similar in function and configuration to the cameras 193 described above, with at least one of the cameras oriented to image a wearer's eyes when wearing the headset 216 and another of the cameras being oriented away from the headset 216 to image gestures of the wearer and the wearer's surroundings and objects. The headset 216 may also include a microphone 224 that may be similar in function and configuration to the microphone 191, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, etc.

Figure 3:
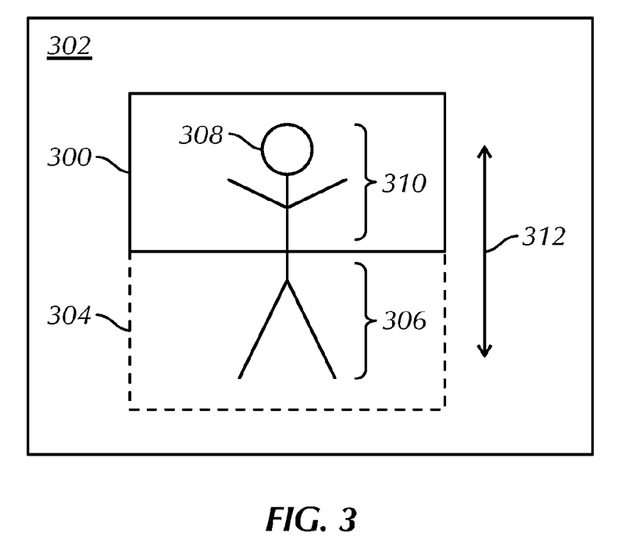
FIGS. 3 and 5-9 are example illustrations in accordance with present principles.

Referring to FIG. 3, it shows an example illustration from the perspective of a person wearing a headset and/or looking at a holographic display in accordance with present principles. A video display 300 is shown as viewed through an at least partially transparent headset display 302, with the video display 300 being a real-world physical display such as a smart phone display or a desktop monitor. The headset itself may present a virtual and/or augmented reality display 304 using the display 302 and/or otherwise present a representation of another display.

As may be appreciated from FIG. 3, the virtual display 304 may be presented using the display 302 so that it, and a portion 306 of content 308, appears adjacent to the display 300 to the user while wearing the headset and viewing the display 300 through the at least partially transparent display 302. Note that another portion 310 of the content 308 is presented using the display 300, as may be done based on the headset communicating with the display 300 (or another device controlling the display 300) to apportion content between the displays, such as using a content apportioning algorithm, for instance. Adjacent may be abutting the display 300 such that no break or gap in the content may be perceived between the displays 300 and 304 so that the content appears continuous, and/or adjacent may be appearing as though next to or within a threshold distance of the display 300.

Thus, as may also be appreciated from FIG. 3, the content 308 may appear uniform and/or continuous from the perspective of the user shown even though presented using both the display 302 of the headset being worn by the user and the display 300 distanced from the user/headset, regardless of the headset user moving from one position to another relative to the display 300 while wearing the headset. This may be done using three dimensional (3D) graphics rendering algorithms and/or processing, virtual reality (VR) graphics rendering algorithms and/or processing, augmented reality (AR) graphics rendering algorithms and/or processing, etc.

Arrows 312 indicate a direction in which scrolling may be performed based on a user command to do so. The scrolling of the content 308 may be shown jointly using the displays 300 and 304 so that the display 300 appears "extended" to a user owing to the virtual display 304 being represented to the user. Thus, even while scrolling, content may be presented using both of the displays 300 and 304.

Figure 4:
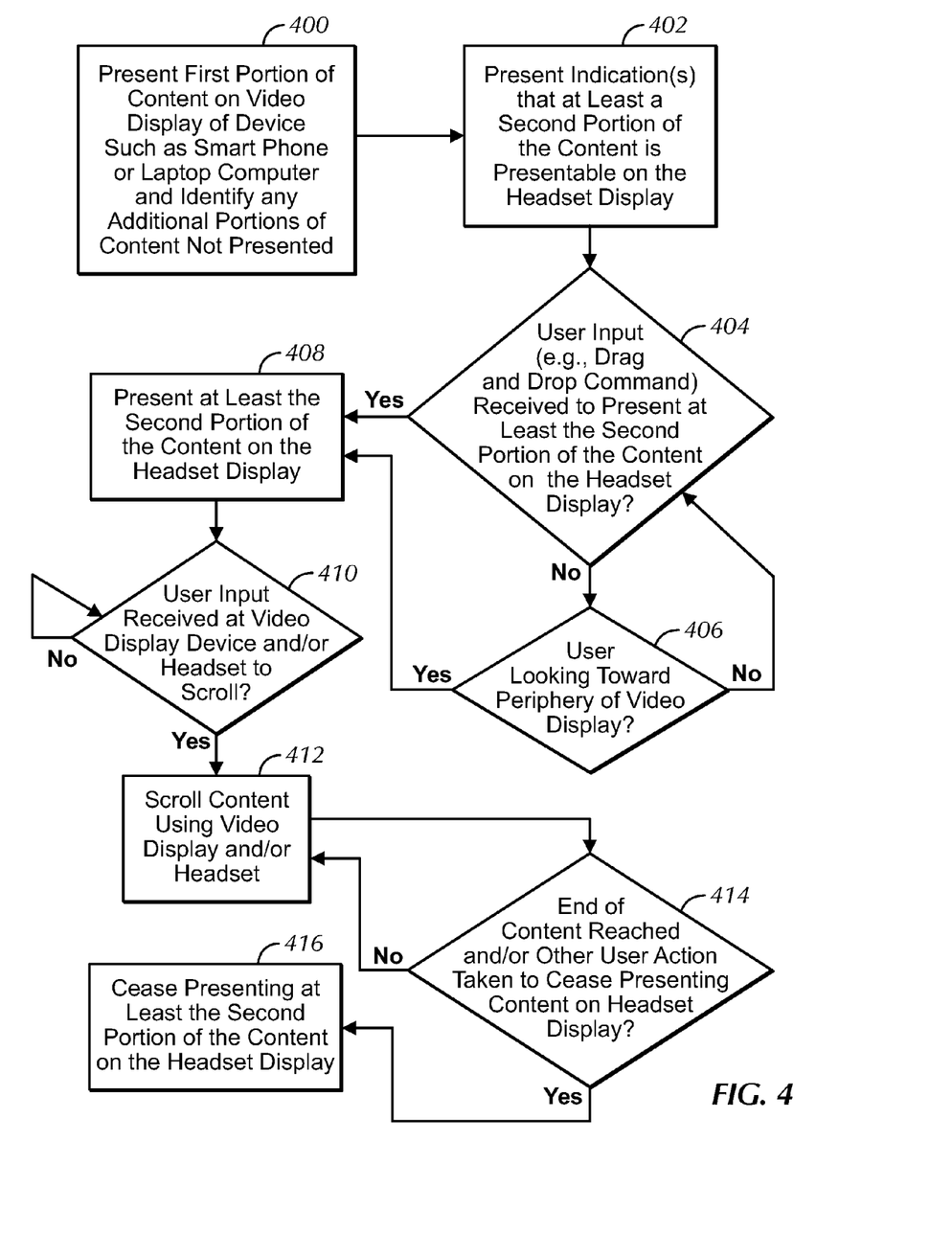
FIG. 4 is a flow chart of an example algorithm in accordance with present principles.

With the foregoing in mind, reference is now to FIG. 4. It shows example overall logic that may be executed by a device such as the system 100 and/or headset 216 for apportioning and/or presenting content between the system/headset's at least partially transparent display and another display in accordance with present principles. Notwithstanding, it is to be understood that the present logic may be executed by a device controlling another type of display besides one on a headset, such as a holographic display. Regardless, for convenience, the device undertaking the logic of FIG. 4 will be referred to as a headset, and indeed in at least one embodiment the logic described below may be executed in whole by a headset while in other embodiments it may be executed in part by a headset in conjunction with another device with which it is communicating.

Beginning at block 400, the logic receives a first portion of content and presents it on a video display of a device such as a smart phone or laptop computer in communication with the headset. This may be done, for instance, responsive to a user command to present the content. Also at block 400, the logic may receive and/or identify data pertaining to any additional portions of the content that are not presented on the video display.

Responsive to receiving and/or identifying additional portions of the content that are not presented on the video display, the logic may move to block 402 where the logic may present one or more indications and/or icons that at least a second portion of the content is presentable on a headset's display concurrently with presentation of the first portion on the video display.

From block 402 the logic may next move to decision diamond 404. At diamond 404 the logic may determine whether input has been received to present at least the second portion of the content on the headset display. For example, user input may be received at a selector presented on the video display to present the second portion. User input may also be received by identifying a user as looking for a predetermined time at the selector as presented using the headset display (e.g., as identified using eye tracking software and images from a camera imaging the user's eyes). Still further, user input may be received based on receipt of a drag and/or drop command at the video display (which may be touch-enabled) to drag at least a portion of the content off of the video display (where the second portion may subsequently be presented using the headset display to appear at a location adjacent to the video display at which the content was dragged off the video display). Still other types of user input may be received at diamond 404 in accordance with present principles. In any case, responsive to a negative determination at diamond 404 the logic may move to decision diamond 406, while responsive to an affirmative determination the logic may move to block 408.

First discussing diamond 406, at this step the logic may determine whether a user is looking at least toward a periphery of the video display, and in some embodiments specifically toward a periphery of a portion of the video display on which images are presentable (e.g., as opposed to an outer periphery of the video display's housing). The determination at diamond 406 may be performed by executing an eye tracking algorithm or eye tracking software on images from a camera that takes images of the eyes of the user of the headset, such as a camera on the headset itself, to determine the depth and direction of the user's focus and hence whether the user is looking at the periphery. Accordingly, it is to be further understood that the location of the periphery itself may be identified, such as by executing an object recognition algorithm or object recognition software on images from a camera imaging the video display, and/or executing a spatial analysis algorithm or spatial analysis software on images from the camera. Additionally or alternatively, the location of the periphery may be identified using known location data for the video display that is accessible to the device executing the present logic.

Responsive to a negative determination at diamond 406, the logic may revert to back to diamond 404 and continue therefrom. However, responsive to an affirmative determination at diamond 406, the logic may continue to the aforementioned block 408. At block 408 the logic may present at least the second portion of the content on the headset's display using, for example, augmented reality processing so that the second portion as presented on the headset's display appears adjacent to first portion presented on the video display to the user while wearing the headset upright to view the video display through the headset's display. Thus, owing to the use augmented reality processing and the use of the headset's display to present the second portion, the second portion may appear adjacent to the first portion regardless of the location of the user relative to the video display and/or whether the user moves his or her head while viewing the first content as presented on the video display through the headset's display.

From block 408 the logic may proceed to decision diamond 410. At diamond 410 the logic may determine whether user input has been received to scroll through the content, such as user input received at the video display itself in embodiments where the video display is touch-enabled. Additional types of user input for scrolling may also be received and identified, such as scrolling using a cursor presented on the display under control of a mouse, scrolling using a scroll wheel of a mouse, scrolling using verbal commands, scrolling using gestures in free space commands, scrolling using input directed to the headset, etc.

Responsive to a negative determination at diamond 410, the logic may continue making the determination at diamond 410 until an affirmative determination is made. Responsive to an affirmative determination at diamond 410, the logic may then move to block 412.

At block 412 the logic may scroll through the content in a direction per the user input to scroll. The scrolling may entail scrolling through the content while still presenting portions thereof using both the video display and headset display as described herein. However, in other embodiments where the content may be presented using the headset display alone as will be discussed further below, the scrolling may entail scrolling through the content as presented using the headset display alone even if, e.g., the scroll command is a "swiping" scroll command directed to the video display.

From block 412 the logic may move to decision diamond 414. At diamond 414 the logic may determine whether an end of the content has been reached in the direction of the scrolling performed at block 412. Additionally or alternatively, at diamond 414 the logic may determine whether the user has provided input to the device controlling the video display and/or to the headset to cease presenting the content or particular portions thereof. The input to cease presenting the content may be input to cease presenting the content using both displays, or input to cease presenting the content using the headset display specifically.

Responsive to a negative determination at diamond 414, the logic may revert back to block 412 and proceed therefrom. Responsive to an affirmative determination at diamond 416, the logic may proceed to block 416.

At block 416 the logic may cease presenting at least the second portion of the content on the headset display. Again, this may be performed responsive to scrolling to the end of the content in a direction of the scrolling as discussed above and/or responsive to user input to cease presenting at least a portion of the content. If performed responsive to scrolling to the end of the content in a direction of the scrolling, the logic may, for example, cease presenting any content on the headset's display at block 416 and merely present as much of the scrolled-to portion of the content as can fit on the video display based on the video display's size and the size of the content as displayed. If performed responsive to input to cease presenting the content on both displays, at block 416 the logic may do so. If performed responsive to input to cease presenting the second portion (or any of the content) on the headset display specifically, at block 416 the logic may do that instead.

Figure 5:
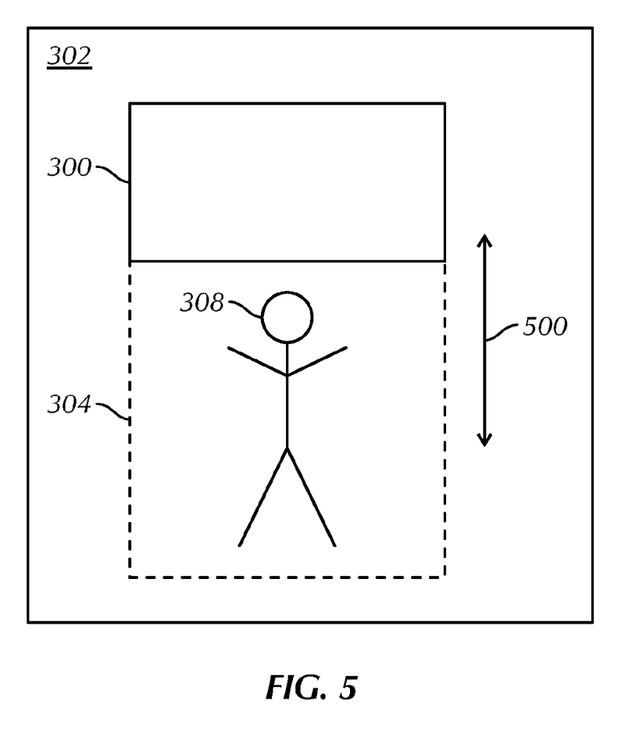

Referring to FIG. 5, it shows another example illustration from the perspective of a person wearing a headset in accordance with present principles. The video display 300 referenced above is again shown as viewed through the at least partially transparent headset display 302, and the headset may present the virtual display 304 using the at least partially transparent display 302 as described above.

As may be appreciated from FIG. 5, the virtual display 304 may be presented using the display 302 so that the virtual display 304, and accordingly the content 308 as represented as being presented on the virtual display 304, appears adjacent to the display 300 to the user while wearing the headset and viewing the display 300 through the at least partially transparent display 302. In contrast to FIG. 3, the content 308 (including the portions 306 and 310) is presented using the display 304 (via the display 302) but not using the display 300. This may be done in embodiments where the headset is configured to present all content using the headset display 302 but not the video display 300 when the headset display is used to present content, based on user input to do so, etc. Additionally, arrows 500 indicate a direction in which scrolling may be performed to scroll content as presented on the virtual display 304 based on a user command to do so.

Figure 6:
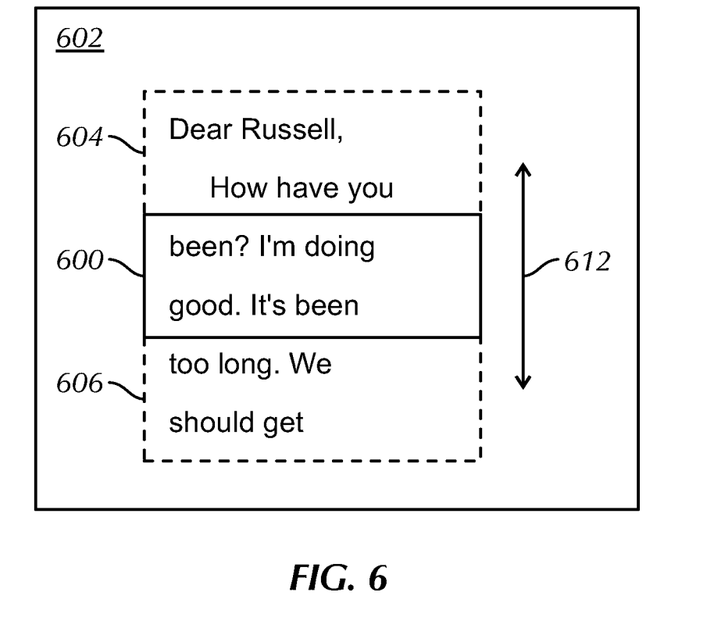

Continuing the detailed description in reference to FIG. 6, it shows another example illustration from the perspective of a person wearing a headset in accordance with present principles. A video display 600 is shown as viewed through an at least partially transparent headset display 602, with the video display 600 being a real-world physical display such as a smart phone display or a desktop monitor. The headset itself may present plural virtual and/or augmented reality displays 604, 606 using the display 602.

As may be appreciated from FIG. 6, the virtual displays 604, 606 may be presented using the display 602 so that they may be used in conjunction with the display 600 to jointly present content of an email by presenting respective portions of the email as shown. In doing so, the display 600 may appear enlarged to the wearer of the headset while wearing the headset and viewing the display 600 through the at least partially transparent display 602. The headset may communicate with the display 600 (or another device controlling the display 600) to apportion the email content between the displays.

Thus, as may also be appreciated from FIG. 6, the content of the email may appear uniform and/or continuous from the perspective of the user shown even though presented using both the display 602 and the display 600 distanced from the user/headset, regardless of the user moving from one position to another relative to the display 600 while wearing the headset. Again, this may be done using three dimensional (3D) graphics rendering algorithms and/or processing, virtual reality (VR) graphics rendering algorithms and/or processing, augmented reality (AR) graphics rendering algorithms and/or processing, etc.

Further, arrows 612 are shown that indicate a direction in which scrolling may be performed based on a user command to do so. The scrolling of the email content may be shown jointly using the displays 600, 604, and 606.

Figure 7:
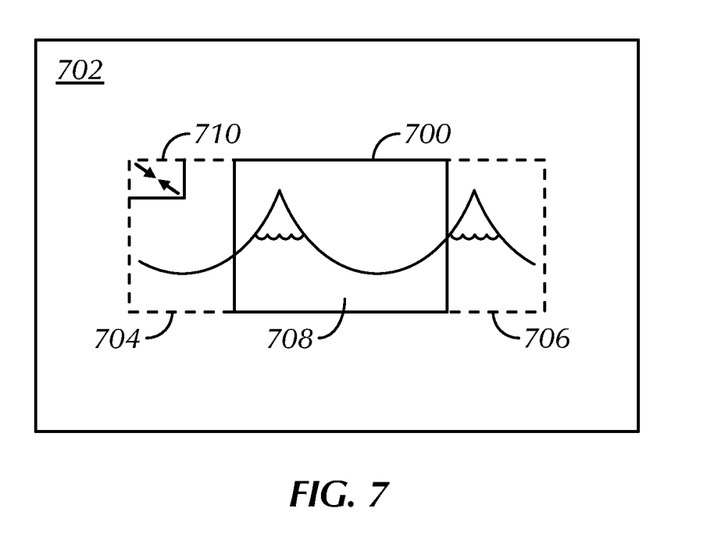

FIG. 7 it shows yet another example illustration from the perspective of a person wearing a headset in accordance with present principles. A video display 700 is shown as viewed through an at least partially transparent headset display 702, with the video display 700 being a real-world physical display such as a smart phone display or a desktop monitor. The headset itself may present plural virtual and/or augmented reality displays 704, 706 using the display 702. As may be appreciated from FIG. 7 and in contrast to FIG. 6, the displays 704, 706 are represented to the headset wearer as though appearing to the left and right sides of the display 700 rather than to the top and bottom sides of the video display as shown in FIG. 6. Further, note that the displays 704, 706 need not necessarily be represented to the wearer as having the same or similar heights and widths as the video display 700. For example, they may be virtually shown as less wide than the video display 700 but with the same height, with the widths of the displays 74, 706 being dependent on the amount of content to be presented using them.

For example, a panoramic photograph 708 of a mountain range may be presented with a majority and laterally-central section of the photograph 708 presented using the video display 700 and equal-width left and right portions of the photograph 708 respectively presented using the virtual displays 704, 706. The virtual displays 704, 706 need not be represented to the wearer as extending to the left and right, respectively, from the display 700 beyond the left and right sides of the photograph 708, though they may in other embodiments.

Additionally, a selector 710 is shown using the virtual display 704, though in other embodiments it may be presented on a portion of the video display 700 itself. In any case, the selector 710 may be selectable (e.g., using eye input by looking at the selector 710 for a threshold amount of time) to reduce the size of presentation of the photograph 708 and present it in full using only the video display 700.

Figure 8:
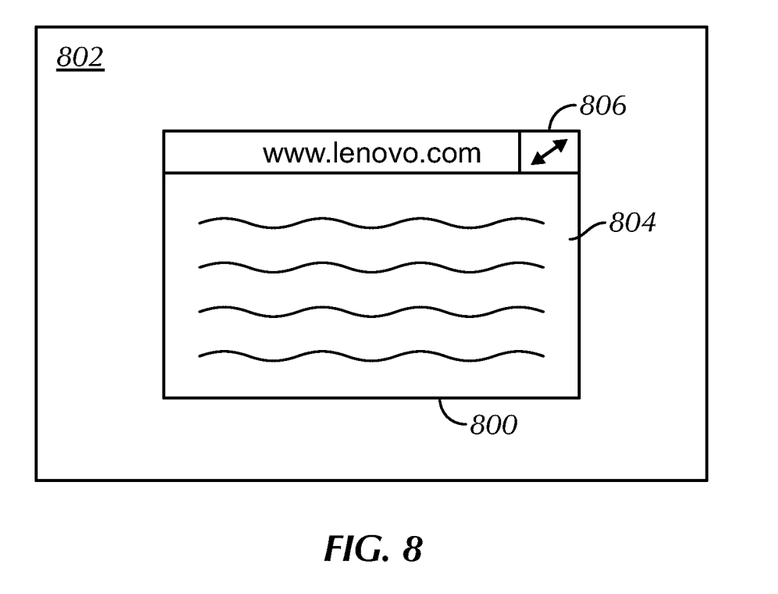

FIG. 8 shows an additional example illustration from the perspective of a person wearing a headset in accordance with present principles. A video display 800 is shown as viewed through an at least partially transparent headset display 802. As shown in FIG. 8, the video display 800 is presenting website content 804.

The video display 800 may also present a selector 806. The selector 806 may be selectable (e.g., using eye input by looking at the selector 806 for a threshold amount of time) to expand the size of presentation of the website content 804, and to present it jointly using the video display 800 and the at least partially transparent display 802 or to present it using the at least partially transparent display 802 alone.

Notwithstanding, in other embodiments the selector 806 may indicate that additional portions of the content 804 are presentable using the headset display that are not currently presented using the video display 800, and the selector 806 may be selectable to (while one portion of the content 804 is presented on the video display) present the additional content using the headset display. For instance, if a website request is submitted which in turn causes a top portion of that website to be presented in a browser window presented on the video display 800, a selector may be presented indicating that additional, lower portions of the website may be presented using the headset display 802 while the top portion remains presented as it already was using the video display 800.

Figure 9:
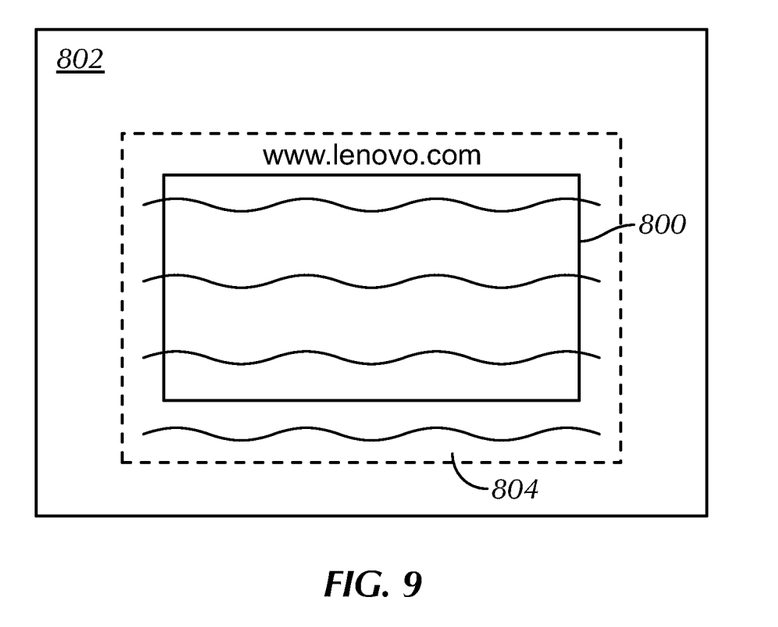

One example of expanded website content as referenced above is shown in FIG. 9, where the website content 804 is presented jointly using the video display 800 and portions of the at least partially transparent display 802 to represent the content in an enlarged form that expands in height and width dimensions beyond the outer periphery of the video display 800. Portions of the content 804 within the bounds of the video display 800 as shown in FIG. 9 may be presented using the video display 800, while portions of the content 804 outside the bounds of the video display 800 as shown in FIG. 9 may be presented using the at least partially transparent display 802.

Notwithstanding, it is to be understood, as indicated above, that in some embodiments the entirety of the expanded content 804 as shown in FIG. 9 may be presented using the display 802 alone, while the display 800 may be placed in standby mode, turned off, darkened, and/or faded to black in some examples to make it easier for the wearer to observe the content 804 as presented on the display 802 alone.

Figure 10:
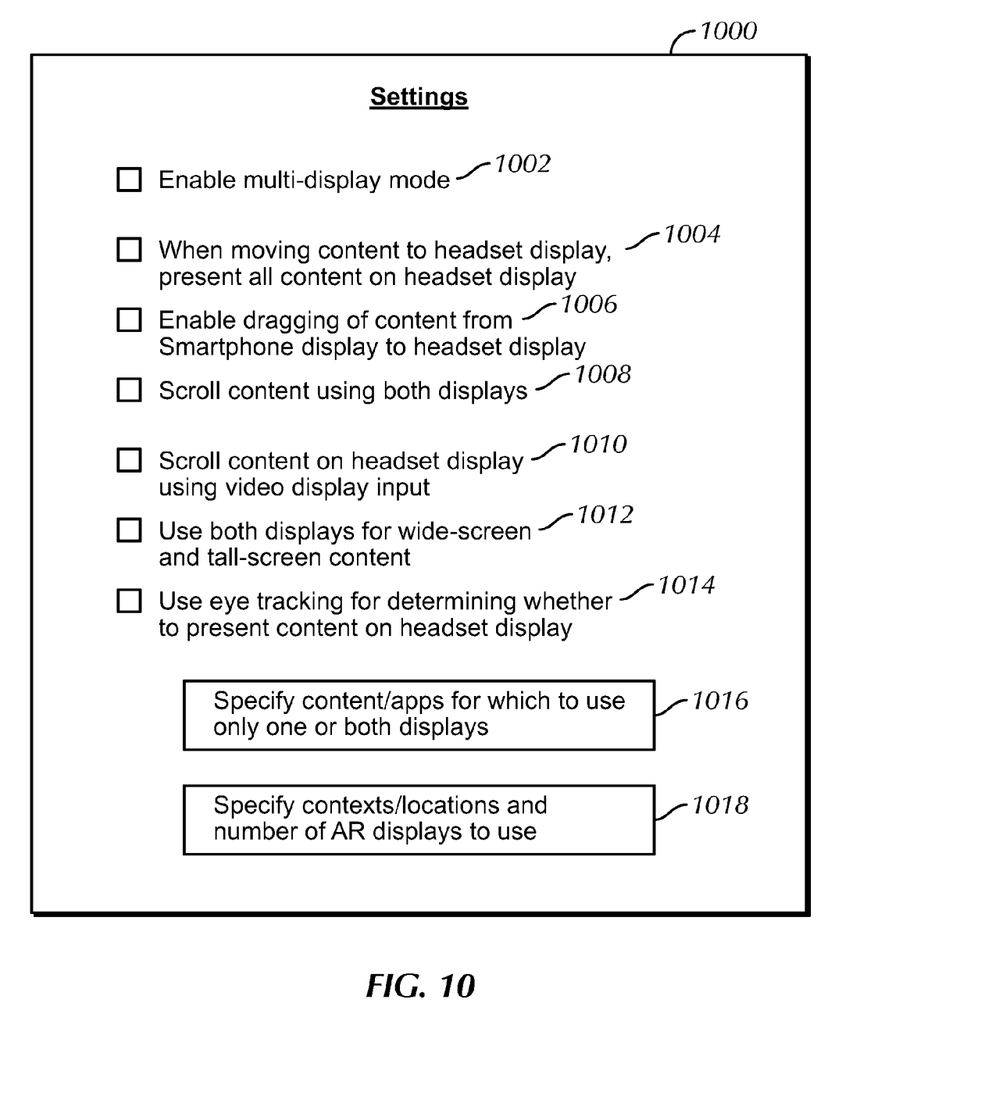
FIG. 10 is an example user interface (UI) in accordance with present principles.

Continuing the detailed description in reference to FIG. 10, it shows an example user interface (UI) 1000 for configuring settings of a device undertaking present principles and that may be presentable on a display of such a device, such as a video display of a laptop computer in communication with a headset and/or on a display of the headset itself. Each of the options to be discussed below may be respectively selected by a user via user input to check the respective check box shown adjacent to each option shown in FIG. 10.

The UI 1000 may include a first option 1002 selectable to enable a multi-display mode in which a video display and headset display may both be used to present content as described herein. A second option 1004 may also be presented that is selectable to enable the device to present content on the headset's display alone (and hence not on the video display) when a user provides input to move at least some content to the headset display such as via a drag and drop action as discussed herein. The UI 1000 may also include a third option 1006 that is selectable to enable the device to allow the dragging of content to the headset's display from the display of another device such as a smartphone.

Still further, the UI 1000 may include another option 1008 that is selectable to enable the scrolling of content when the content is presented jointly using the headset's display and the video display of another device. An option 1010 is also shown that is selectable to enable the scrolling of content as presented on a headset display alone using input to the other video display such as swiping scroll input across the video display.

The UI 1000 may further include an option 1012 selectable to enable automatic use of both the headset display and other video display for presenting preconfigured widescreen and/or tallscreen content such as a widescreen version of a motion picture. Still further, the UI 1000 may also include an option 1014 selectable to enable use of eye tracking for determining whether to present content on the headset display as described herein.

Still in reference to FIG. 10, in some embodiments the UI 1000 may include a selector 1016 that is selectable to automatically without further user input cause another UI to be presented at which a user may provide input specifying one or more contents, content types, and/or applications for which to use only one of the displays (and for specifying which of the headset display or video display of another device to use) or for which to use both displays. Another selector 1018 may also be presented that is selectable to automatically without further user input cause another UI to be presented at which a user may provide input specifying a number of augmented and/or virtual reality displays to use in a given situation based on, e.g., certain contexts and physical locations of a user. For example, at such a UI a user may provide input to use two such virtual displays on each side of a real-world video display at home to present content, and to use three virtual displays while at work.

It may now be appreciated that present principles provide for utilizing virtual and/or augmented reality capabilities to intelligently "extend" a real-world video display. When all of a piece of content does not otherwise fit on the video display or when the user interacts with the video display, a "VR-extended" display may be temporarily presented to make interaction with the video display and/or content easier. Directional flow of the content may play a factor in where the VR display appears to be presented to the headset wearer so that, for example, if the flow or scrolling of content is to the right of content presented on the video display, the VR display may be presented as though disposed to the right of the video display to present the additional content.

For example, suppose a user is wearing a headset and looking at a list of settings on his or her smartphone. The smartphone may only fit five of ten total settings on its display at one time, so a VR extended display may be created as though appearing below the smartphone display to show the additional five settings. If the user scrolls down in the list, another VR display may be created as though appearing above the smartphone display to show the items previously presented on the smartphone display that were scrolled off the smartphone display as scrolling continues. Additionally, when the user scrolls to the end of the list or causes another screen or application to be presented, the VR display may cease to be presented.

Such VR displays may be created on-the-fly when all of a piece of content has been determined to not adequately fit on the video display of another device (e.g., at a particular content/font size or resolution viewable to the user). A fuzzy algorithm may also be used to determine whether a person can read content as presented on a real-world display alone or whether at least some of the content should be presented using a virtual display.

Additionally, minimum and maximum sizes for such VR displays may be configured by the user so that, for example, the user may specify how much otherwise off-screen content should exist off screen for a given piece of content before creating a VR display to present it, such as ten percent of all of the piece of content being off screen or an amount being off screen as expressed in another way such as by length/distance.

Eye tracking may also be used to trigger creation of a VR display when looking at the edge of the content on the real-world video display of the other device besides the headset. Additionally or alternatively, VR displays may be activated when the user is interacting with the video display of the other device using proximity detection for their hands moving over the video display or near the edge of the video display.

Providing another example in accordance with present principles, suppose a user is using his or her car's GPS display and that there exists an important landmark/destination just off screen of the GPS display that would be helpful for the user to know about. A VR display may be created adjacent to the GPS display so the user may see the point of interest.

As yet another example, suppose a user is consuming web content that does not fit well on a currently-used video display of a tablet computer. A VR display may be created that is large enough to view the content and the entire piece of content may be moved to that VR display. Even if not all of the content is presented on the VR display at a given time, that content may be scrolled to if desired. Then, when the user puts the tablet computer down, turns it off, closes the currently used application or otherwise stops using the tablet computer, the tablet computer may detect as much and communicate with the headset being worn by the user to trigger the VR display to close out or cease being presented.

Furthermore, in accordance with present principles a user of a headset may specify that certain content and/or applications presented on certain other devices associated with the user may be automatically moved to a VR display or extended to the VR display. For instance, a list of items may be adequately presented from the perspective of a given user by jointly using both displays, whereas that user may also prefer that certain web pages be presented using a VR display alone.

Furthermore, if content is moved to the VR display alone, the other device's display may then be used to control scrolling/selection input for content presented on the VR display (e.g., until the user reverts back to presentation of content on the other device's video display alone).

What's more, if desired the user may provide configuration input for the headset to persistently and transparently show a VR display (and/or icon indicating a VR display is available) around the perimeter of a physical video display being viewed through the transparent display of the user's headset so that the user is aware of the VR display's existence and knows he or she may activate it via selection, gesture, or by dragging content to it.

Even further, the user may be permitted to configure the headset's display to, e.g., always use N number of VR displays (such as three) when presenting content. So, for instance, if a user looked to the right while wearing the headset, he or she may see three VR displays to the right, and when user looks back to the left he or she may see two of the VR displays shifted to the left. If user looked up, he or she may see three VR displays vertically stacked one on top of the other. Such VR displays may even be moveable within the user's field of view through the transparent display of the headset, such by selecting one using a cursor under control of a mouse and dragging and dropping it to another position on the transparent display (e.g., relative to the user's field of view through the transparent display).

Additionally, in some embodiments watermarks, dots, or markers may be disposed on front-facing corners of the housing of a real-world video display so that the headset may use them (e.g., as identified based on images from a camera on the headset) for lining up the VR displays correctly to appear adjacent to the real-world video display.

If desired, an extended VR display for joint use with a real-world video display may work as the video display alone would in conjunction with a pointing device, mouse, etc. For example, when a user scrolls their mouse off the edge of the real-world display, the cursor may slide from the real-world display onto the virtual display to still allow the pointing device to be used to click objects presented on the virtual display. Thus, it is to be understood that cursor movement may traverse the content as presented jointly using the real-world display and virtual display.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
    a housing;
    at least one processor coupled to the housing;
    a first, at least partially transparent display coupled to the housing and accessible to the at least one processor; and
    storage coupled to the housing and accessible to the at least one processor, the storage bearing instructions executable by the at least one processor to:
    identify at least a first portion of content presentable on a second display that is not currently presented on the second display; and
    based on the identification, present at least the first portion of the content on the first display so that the first portion appears adjacent to the second display to a user wearing the headset and viewing the second display through the first display.

2. The headset of claim 1, wherein the instructions are executable by the at least one processor to:
    identify, while a second portion of the content is presented on the second display, at least the first portion of the content; and
    based on the identification, present at least the first portion of the content on the first display.

3. The headset of claim 2, wherein the instructions are executable by the at least one processor to:
    based on the identification, present the first portion of the content on the first display and present the second portion of the content on the first display.

4. The headset of claim 3, wherein the instructions are executable by the at least one processor to:
    while the first portion of the content and the second portion of the content are presented on the first display, receive a scroll command generated based on input to the second display; and
    responsive to receipt of the scroll command, scroll the first portion of the content and the second portion of the content presented on the first display.

5. The headset of claim 2, wherein the instructions are executable by the at least one processor to:
    determine, while the second portion of the content is presented on the second display and the first portion of the content is presented on the first display, that a scroll command has been received; and
    responsive to the scroll command, present the second portion of the content on the first display.

6. The headset of claim 1, wherein the instructions are executable by the at least one processor to:
based on the identification, present the content using the first display alone.

7. The headset of claim 1, wherein the second display is disposed on a device different from the headset, and wherein the device is in communication with the headset.

8. The headset of claim 1, wherein the headset is one or more of: an augmented reality headset, electronic glasses.

9. The headset of claim 1, wherein the first portion of the content is identified based on a communication from a device that controls the second display and that accesses the content.

10. The headset of claim 1, wherein the instructions are executable by the at least one processor to:
present at least the first portion of the content on the first display responsive to determining that a user is looking at least toward the periphery of a portion of the second display at which images are presentable.

11. The headset of claim 1, wherein the instructions are executable by the at least one processor to:
indicate, while a second portion of the content is presented on the second display, that additional content is presentable using the first display.

12. A method, comprising:
determining that at least a first portion of content presentable on a first display of a device is not currently presented on the first display; and
presenting, based on the determining, at least the first portion of the content on a second display of a headset so that the first portion appears, to a user wearing the headset, adjacent to a second portion of the content as presented on the first display.

13. The method of claim 12, comprising:
presenting at least the first portion of the content on the second display responsive to determining that a user is looking at least toward the periphery of a portion of the first display at which images are presentable.

14. The method of claim 12, comprising:
responsive to a predetermined user action, cease presenting the first portion of the content on the second display.

15. The method of claim 12, wherein the method comprises:
determining, while the second portion of the content is being presented on the first display, that at least the first portion of the content is not currently presented on the first display; and
presenting, based at least in part on the determining, at least the first portion of the content on the second display.

16. The method of claim 12, wherein the method comprises:
indicating, while the second portion of the content is presented on the first display, that additional content is presentable using the second display.

17. The method of claim 12, comprising:
determining, while the second portion of the content is presented on the first display and the first portion of the content is presented on the second display, that a scroll command has been received; and
responsive to the scroll command, presenting the second portion of the content on the second display.

18. An apparatus, comprising:
a first processor;
a network adapter; and
storage bearing instructions executable by a second processor for:
identifying at least a portion of content presentable on a video display that is also presentable on an at least partially transparent display of a headset; and
presenting, responsive to the identifying, at least the portion of the content on the at least partially transparent display of the headset so that the portion appears to a wearer of the headset to be adjacent to the video display;
wherein the first processor transfers the instructions to the second processor over a network via the network adapter.

19. The apparatus of claim 18, wherein the instructions are executable by the second processor for:
presenting, responsive to user input, at least the portion of the content on the at least partially transparent display of the headset so that the portion appears to the wearer of the headset to be adjacent to the video display.

20. The apparatus of claim 19, wherein the user input comprises input to drag at least the portion of the content off the video display to be presented on the at least partially transparent display of the headset.

* * * * *